United States Patent [19]

Livemore

[11] 4,325,716
[45] Apr. 20, 1982

[54] MIXING CHAMBER IN COMBINATION WITH A DUST CYCLONE SEPARATOR

[76] Inventor: Gerald S. V. Livemore, 121 Holt St., Parkmore, Transvaal, South Africa

[21] Appl. No.: 178,333

[22] Filed: Aug. 15, 1980

[51] Int. Cl.³ .................... B01D 51/00; B01F 3/02; C10K 1/02
[52] U.S. Cl. ........................ 55/265; 55/267; 55/385 R; 55/414; 55/459 R; 48/180 M
[58] Field of Search ............ 55/261, 265, 267, 385 R, 55/410, 414, 459 R; 48/180 B, 180 M, 128

[56] References Cited

U.S. PATENT DOCUMENTS

| 545,125 | 8/1895 | Grist | 48/180 M |
|---|---|---|---|
| 964,409 | 7/1910 | Fox | 48/180 M |
| 2,252,581 | 8/1941 | Saint-Jacques | 55/410 |
| 3,064,811 | 11/1962 | Mumper | 55/459 R |
| 3,273,320 | 9/1966 | Delaune et al. | 55/267 |
| 3,519,024 | 7/1970 | Johnson et al. | 55/418 |
| 3,684,093 | 8/1972 | Kono et al. | 55/261 |
| 3,862,907 | 1/1975 | Shimotsuma et al. | 48/180 M |

FOREIGN PATENT DOCUMENTS 1035313 10/1953 France .................. 55/410

Primary Examiner—David L. Lacey
Attorney, Agent, or Firm—Marvin A. Naigur; John E. Wilson; John J. Herguth, Jr.

[57] ABSTRACT

A mixing chamber for mixing gases produced in a gas producer in combination with a dust cyclone, the mixing chamber comprising a housing having at least two inlets and a perforated hood structure covering one of the inlets. In use the gas delivered from the dust cyclone through the covered inlet is distributed into a plurality of small streams directed into the supply of gas through the second inlet thus enhancing the mixing of the gases.

4 Claims, 1 Drawing Figure

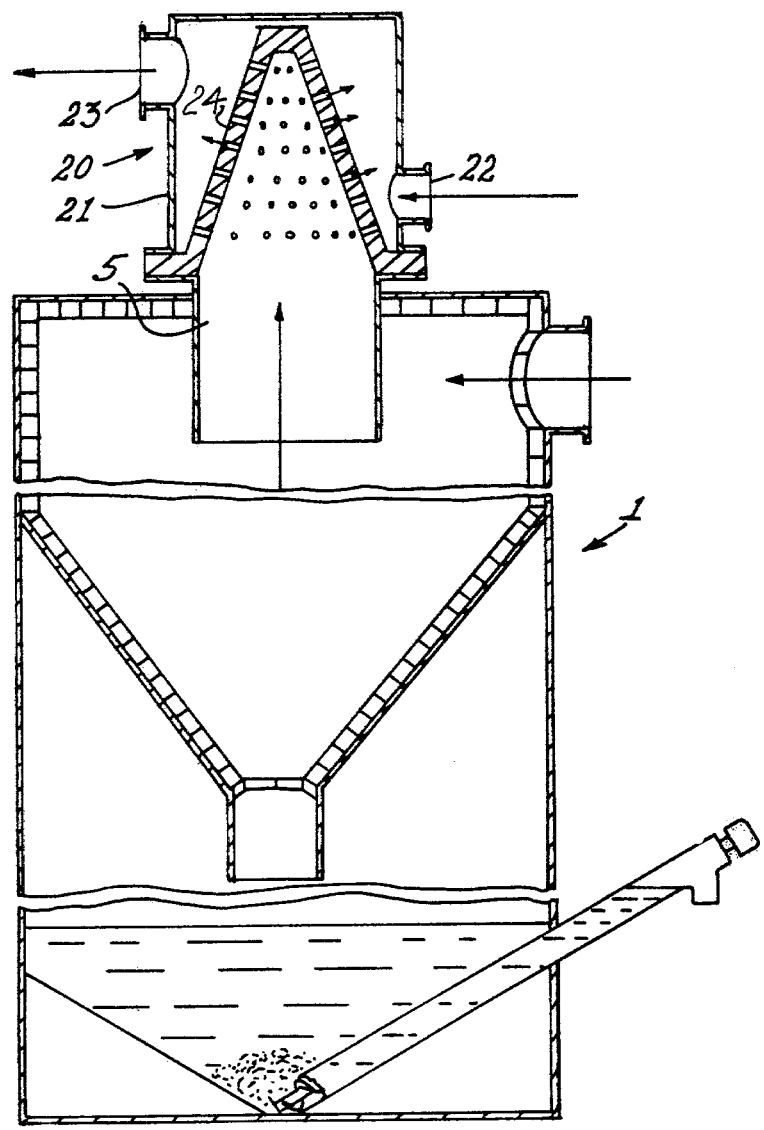

MIXING CHAMBER IN COMBINATION WITH A DUST CYCLONE SEPARATOR

The present invention relates to a mixing chamber suitable for use in mixing producer gases.

It is known in the trade to mix the bottom gas from a gas producer, once it has been passed through a cyclone, with the top gas. This step is normally done in a structure known as a mixing chamber. The conventionally used mixing chamber comprises a substantially rectangular brick-lined housing and includes an inlet for top gas and an inlet for bottom gas in one wall thereof and an outlet in the opposing wall thereof.

This mixing chamber has many disadvantages as the top and bottom gas streams meet together from each end of the chamber without any pre-mixing resulting in a very rapid rise in temperature of top gas at the interface between the two gases causing any of the tar or oils present in the gas to crack and form solid carbon.

According to the invention a mixing chamber of the kind in question comprises a housing having a first inlet adapted to be connected to a first gas supply line, a second inlet adapted to be connected to a second gas supply line, an outlet from the housing and a hollow perforated hood-structure inside the housing substantially covering the sound inlet to the housing, the arrangement being such that in use a gas fed through the second inlet opening is distributed into a plurality of small streams directed into the gas fed into the chamber through the first inlet.

Preferably the hollow perforated hood-structure is conical in shape and the first inlet opening is disposed at right angles to the second inlet opening.

The mixing chamber is preferably mounted on top of the bottom gas dust cyclone.

The chamber may be made of metal and the hood element may be of refractory casting.

A preferred embodiment of the invention will now be described with reference to the accompanying drawing which is a section through a mixing chamber according to the invention mounted on a cyclone.

The mixing chamber 20 is mounted on top of the cyclone 1 and over the outlet 5 from the cyclone. The mixing chamber 20 includes a steel housing 21, an inlet for top gas 22 and an outlet 23.

A cone shaped aperture hood 24 of refractory casting is located inside the chamber 20 and over the outlet 5. Accordingly, gas from the cyclone 1 passing through outlet 5 is divided into a plurality of small streams of gas which are then mixed with the top gas which is delivered into the chamber through inlet 22.

Many variations of detail may of course be thought of without thereby departing from the spirit of the invention.

What is claimed is:

1. A bottom gas cyclone dust separator having a clean gas outlet adapted to receive the bottom gas from a gas producer and separate the dust from the bottom gas, in combination with a mixing chamber, said mixing chamber comprising a housing having a top gas inlet connected to a line conveying top gas from said gas producer, a bottom gas inlet connected to the clean gas outlet so that the clean bottom gas exiting therefrom enters said mixing chamber through said bottom gas inlet, a perforated hollow hood positioned inside said housing substantially covering said bottom gas inlet wherein bottom gas entering said housing is distributed directly into the gas fed into said mixing chamber through said bottom gas inlet.

2. The combination defined in claim 1, wherein the hollow perforated hood structure is conical in shape and said top gas inlet is disposed at right angles to said bottom gas inlet opening.

3. The combination defined in claim 1, wherein said mixing chamber is mounted directly on top of said bottom dust cyclone separator.

4. The combination defined in claim 1 wherein said housing is made of metal and the hood element is made of refractory casting.

* * * * *